(12) United States Patent
Hawkes et al.

(10) Patent No.: US 8,835,074 B2
(45) Date of Patent: Sep. 16, 2014

(54) SOLID OXIDE FUEL CELL HAVING METAL SUPPORT WITH A COMPLIANT POROUS NICKEL LAYER

(75) Inventors: Justin R. Hawkes, Marlborough, CT (US); Sergei F. Burlatsky, West Hartford, CT (US); Sunil G. Warrier, Middletown, CT (US); Shubhro Ghosh, Manchester, CT (US); Jean Colpin, Avon, CT (US)

(73) Assignee: Ballard Power Systems Inc., Burnaby (CA)

( * ) Notice: Subject to any disclaimer, the term of this patent is extended or adjusted under 35 U.S.C. 154(b) by 115 days.

(21) Appl. No.: 13/145,382

(22) PCT Filed: Jan. 22, 2009

(86) PCT No.: PCT/US2009/031651
§ 371 (c)(1),
(2), (4) Date: Jul. 20, 2011

(87) PCT Pub. No.: WO2010/085248
PCT Pub. Date: Jul. 29, 2010

(65) Prior Publication Data
US 2011/0275006 A1      Nov. 10, 2011

(51) Int. Cl.
*H01M 8/10* (2006.01)
*H01M 8/12* (2006.01)
*H01M 8/02* (2006.01)
*H01M 4/86* (2006.01)

(52) U.S. Cl.
CPC ............ *H01M 8/1226* (2013.01); *Y02E 60/525* (2013.01); *H01M 4/8657* (2013.01); *Y02E 60/521* (2013.01); *H01M 8/0254* (2013.01); *H01M 8/0228* (2013.01); *H01M 2008/1293* (2013.01); *H01M 8/0245* (2013.01); *H01M 8/0232* (2013.01); *H01M 2004/8689* (2013.01)
USPC ............................ 429/479; 429/481; 429/485

(58) Field of Classification Search
USPC ......................................... 429/479, 481, 485
See application file for complete search history.

(56) References Cited

U.S. PATENT DOCUMENTS

| | | | |
|---|---|---|---|
| 5,908,713 A | 6/1999 | Ruka et al. | |
| 6,444,340 B1 * | 9/2002 | Jaffrey | 429/456 |
| 7,144,649 B2 | 12/2006 | Yamanis et al. | |
| 2004/0200187 A1 | 10/2004 | Warrier et al. | |

OTHER PUBLICATIONS

International Preliminary Report dated Aug. 4, 2011.
Search Report and Written Opinion mailed Sep. 17, 2009 for PCT/US2009/031651.

* cited by examiner

*Primary Examiner* — Jane Rhee
(74) *Attorney, Agent, or Firm* — Seed IP Law Group PLLC

(57) ABSTRACT

A fuel cell includes a cell having a solid oxide electrolyte between electrodes. The cell has a first coefficient of thermal expansion. A metallic support is in electrical connection with one of the electrodes. The metallic support includes a metal substrate and a compliant porous nickel layer that is bonded to the metal substrate between the cell and the metal substrate. The metal substrate has a second coefficient of thermal expansion that nominally matches the first coefficient of thermal expansion of the cell. The metal substrate has a first stiffness and the compliant porous nickel layer has a second stiffness that is less than the first stiffness such that the compliant porous nickel layer can thermally expand and contract with the metal substrate.

17 Claims, 1 Drawing Sheet

SOLID OXIDE FUEL CELL HAVING METAL SUPPORT WITH A COMPLIANT POROUS NICKEL LAYER

BACKGROUND OF THE DISCLOSURE

This disclosure relates to solid oxide fuel cells having metallic supports. Solid oxide fuel cells are commonly known and used for generating electricity. For example, conventional solid oxide fuel cells typically a cell having an anode, a cathode, and an electrolyte between the anode and the cathode. A support structure mechanically supports the cell and may also serve to supply reactant gas and conduct electric current to an external circuit.

One problem associated with such support structures is that the operating environment is severely corrosive. For instance, the fuel cell may be operated at elevated temperatures and the support structure may be exposed to a dual exposure environment of a reactant gas oxidant (e.g., air) on one side and a reactant gas fuel (e.g., hydrogen) on another side. This dual exposure produces an oxidizing environment that can rapidly oxidize common alloys that are used for the support structure, such as stainless steel. Oxidation of the support structure may diminish the mechanical strength and electrical conductivity.

Another problem associated with conventional solid oxide fuel cells is possible damage to the fuel cell from thermal cycling (e.g., ON/OFF cycles). The electrode is typically a ceramic material having a nominal coefficient of thermal expansion ("CTE") of about $11 \times 10^{-6}/°$ C., which is considerably different than most alloys. Stainless steel, however, also has a nominal CTE of about $11 \times 10^{-6}/°$ C. and thereby mitigates thermal stresses between the electrode and the support structure due to thermal cycling. Although alloys with better resistance to oxidation than stainless steel are known, such alloys cannot be directly substituted for the stainless steel because the CTE mismatch with the ceramic material of the electrode may cause damage to the fuel cell under thermal cycling.

SUMMARY OF THE DISCLOSURE

An exemplary fuel cell includes a cell having a solid oxide electrolyte between electrodes. The cell has a first coefficient of thermal expansion. A metallic support is in electrical connection with one of the electrodes. The metallic support includes a metal substrate and a compliant porous nickel layer that is bonded to the metal substrate between the cell and the metal substrate. The metal substrate has a second coefficient of thermal expansion that nominally matches the first coefficient of thermal expansion of the cell. The metal substrate has a first stiffness and the compliant porous nickel layer has a second stiffness that is less than the first stiffness such that the compliant porous nickel layer can thermally expand and contract with the metal substrate.

An exemplary method for processing a fuel cell includes providing a cell with a solid oxide electrolyte between electrodes, where the cell has a first coefficient of thermal expansion; bonding a compliant porous nickel layer to a metal substrate to form a metallic support such that the compliant porous nickel layer is between the cell and the metal substrate, where the metal substrate has a second coefficient of thermal expansion that is less than the first coefficient of thermal expansion of the cell; and establishing the metal substrate to have a first stiffness and the compliant porous nickel layer to have a second stiffness that is less than the first stiffness such that the compliant porous nickel layer can thermally expand and contract with the metal substrate.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
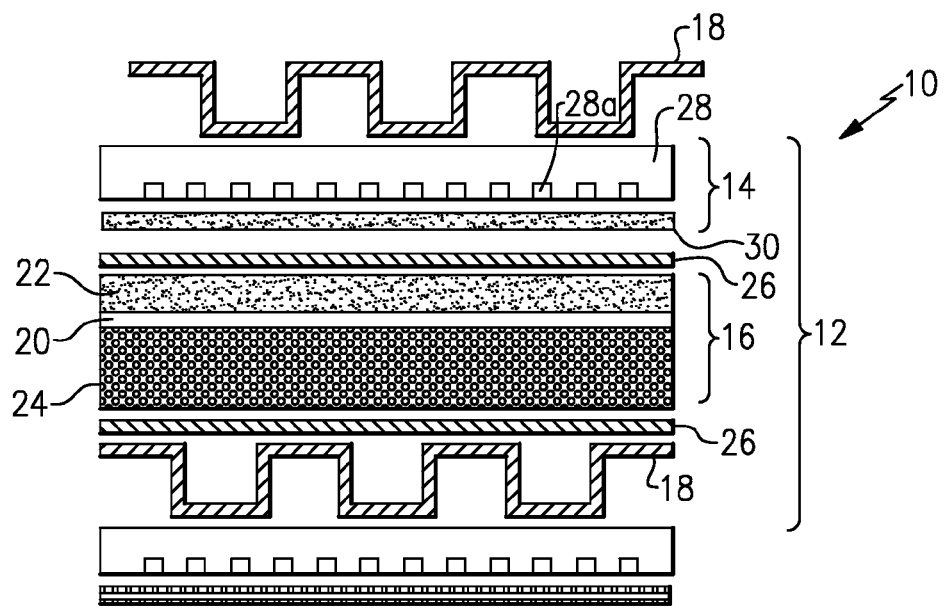
FIG. 1 illustrates an example fuel cell having a compliant porous nickel layer.

FIG. 1 illustrates an exploded view of selected portions of an example fuel cell 10. In this example, the fuel cell 10 includes a fuel cell unit 12 that operates in a known manner to generate electricity. For instance, multiple fuel cell units 12 may be stacked in a known manner to provide a desired amount of electrical output. However, it is to be understood that this disclosure is not limited to the arrangement of the example fuel cell 10, and the concepts disclosed herein may be applied to other fuel cell arrangements.

In the illustrated example, the fuel cell unit 12 includes a metallic support 14 between a cell 16 and an anode interconnect 18. The cell 16 may be a tri-layered arrangement, including a solid oxide electrolyte 20 between a cathode 22 and an anode 24 for providing an electrochemical reaction to generate an electric current. The solid oxide electrolyte 20 may be any type of solid oxide electrolyte, such as ceria ($CeO_2$) doped with rare earth metal oxide (s), gallate (e.g., strontium-doped lanthanum gallate) or stabilized (fully or partially) zirconia. The anode interconnect 18 may be any type of interconnect for conducting electric current and delivering reactant gas to the anode 24.

Optionally, the fuel cell 10 may also include interfacial bonding layers 26 located between the metallic support 14 and the cell 16, and between the anode interconnect 18 and the cell 16. For instance, the interfacial bonding layers 26 may be similar in composition to the respective cathode 22 or anode 24 that is in contact with the given interfacial bonding layer 26. The interfacial bonding layers 26 may facilitate bonding between the cell 16 and the metallic support 14 or anode interconnect 18.

The metallic support 14 includes a metal substrate 28 and a compliant porous nickel layer 30 that is bonded to the metal substrate 28, such as by using a diffusion bonding or welding process. The diffusion bonding or welding process may be conducted in an inert atmosphere or under a vacuum to facilitate avoidance of forming undesired oxide scale and to form a clean, metal-to-metal bond.

The compliant porous nickel layer 30 is in electrical contact with the cell 16, the cathode 22 in this case. In this regard, the compliant porous nickel layer 30 may also be bonded to the cathode 22, or to the interfacial bonding layer 26, if used.

In the illustrated example, the metal substrate 28 is a solid plate having reactant gas channels 28a. However, the metal substrate may be any type of structure for mechanically supporting the cell 16 and delivering reactant gas to the cathode 22.

The metal substrate 28 may be made of a stainless steel material. In one example, the stainless steel may be a ferritic stainless steel, such as stainless steel 446, CROFER®, or other stainless steel having more than about 20 wt % chromium. Likewise, the anode interconnect 18 may also be made of stainless steel. The stainless has a coefficient of thermal expansion that matches the coefficient of thermal expansion of the cell 16. The matching of the coefficients of thermal expansion provide the benefit of facilitating a reduction in thermal stress from thermal cycling of the fuel cell 10 (e.g., from ON/OFF cycles). For instance, the coefficient of thermal expansion of the cell 16 may be approximately $11 \times 10^{-6}/°$ C. and the coefficient of thermal expansion of the metal substrate 28 may also be about $11 \times 10^{-6}/°$ C. In other examples, the coefficients of thermal expansion of the cell 16 and the metal substrate 28 may differ by a predetermined percentage but still be considered matching.

The compliant porous nickel layer 30 may be comprised of a nickel alloy. For instance, the nickel alloy may be a grade of INCONEL®, HASTELLOY®, or HAYNES®. The nickel alloy may include about 22 wt % chromium, about 14 wt % tungsten, about 2 wt % molybdenum, about 0.5 wt % manganese, about 0.4 wt % silicon, about 0.3 wt % aluminum, and a balance of nickel. The term "about" as used in this description relative to compositions or other values refers to possible variation in the given value, such as normally accepted variations or tolerances. The composition may also include other elements or impurities that do not effect the properties of the compliant porous nickel layer 30.

The nickel alloy is highly chemically resistant and facilitates resisting oxidation of the metal substrate 28 to thereby maintain electrical conductivity between the cell 16 and the metallic support 14.

Nickel alloys typically have a coefficient of thermal expansion that is considerably different than the coefficient of thermal expansion of the cell 16 or the metal substrate 28. However, in the fuel cell 10, the in-plane compliance of the compliant porous nickel layer 30 allows a nickel alloy to be used adjacent to the cell 16 without significantly changing the thermal expansion/contraction characteristics of the metallic support 14. For instance, the metal substrate 28 may have a first stiffness and the compliant porous nickel layer 30 may have a second stiffness that is less than the first stiffness. The difference in the stiffness combined with the bonding between the compliant porous nickel layer 30 and the metal substrate 28 allows the metal substrate 28 to control movement of the compliant porous nickel layer 30 during thermal cycling. Thus, the metallic support 14 provides the benefit of an oxidation resistant electrical connection (from the compliant porous nickel layer 30) and a nominal coefficient of thermal expansion (from the metal substrate 28) that is approximately equal to the nominal coefficient of thermal expansion of the cell 16.

Additionally, to the extent that there may be a difference between the coefficients of thermal expansion of the cell 16 and the metal substrate 28, the compliant porous nickel layer 30 may be used to mitigate the difference by compressing or expanding to "absorb" dimensional differences that might otherwise result in thermal stress.

The structure of the porous nickel layer 30 may be any structure that allows compliance and provides a stiffness that is less then the stiffness of the metal substrate 28. For instance, the compliant porous nickel layer 30 may be a wire mesh comprised of interwoven nickel alloy wires or filaments. The wires or the wire mesh may bend to form an interwoven structure but generally do not form any sharp corners that could otherwise cause debonding of the compliant porous nickel layer 30 from the metal substrate 28 and/or cathode 22 or interfacial bonding layer 26.

Figure 2:
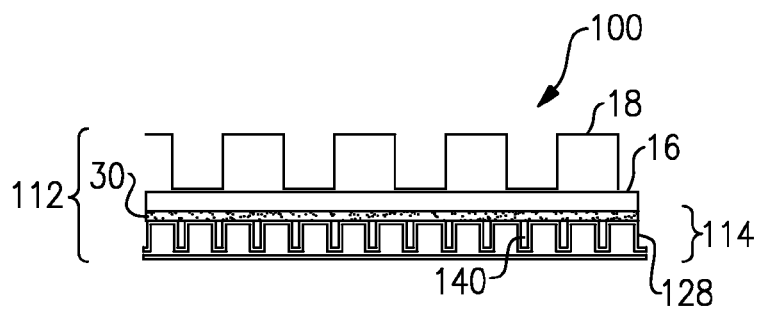
FIG. 2 illustrates another example fuel cell having a compliant porous nickel layer bonded to a corrugated sheet.

FIG. 2 illustrates another example fuel cell 100. In this disclosure, like reference numerals designate like elements where appropriate, and reference numerals with the addition of one-hundred or multiples thereof designate modified elements. The modified elements are understood to incorporate the same features and benefits of the corresponding original elements. In this example, the fuel cell 100 includes a fuel cell unit 112 having a metallic support 114 that includes the compliant porous nickel layer 30 bonded to a metal substrate 128, such as by using a diffusion bonding or welding process. In this example, the metal substrate 128 is a corrugated sheet that forms channels 140 for delivering reactant gas to the cell 16. For instance, the walls of the corrugated sheet may be relatively thin such that the corrugated sheet can be formed in a bending process.

Figure 3:
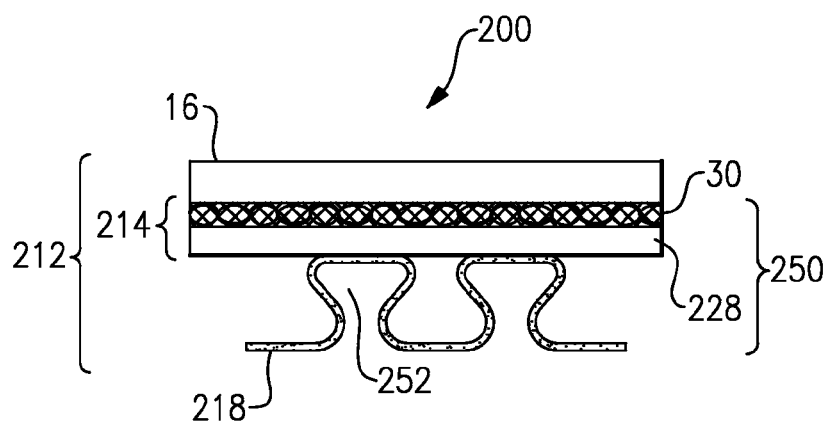
FIG. 3 illustrates another example fuel cell having a compliant porous nickel layer bonded to a solid, planar separator plate.

FIG. 3 illustrates another example fuel cell 200 having a fuel cell unit 212 that includes a bipolar plate 250 supporting the cell 16. In this example, the bipolar plate 250 includes a metallic support 214 and an anode interconnect 218. The anode interconnect 218 in this example is a corrugated sheet having a dovetail shape forming channels 252 for delivering a reactant gas to the cell 16. The metallic support 214 includes the compliant porous nickel layer 30 bonded to a metal substrate 228, such as by using a diffusion bonding or welding process. The metal substrate 228 in this case is a solid, planar separator plate.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A fuel cell comprising:
a cell including a solid oxide electrolyte between electrodes, the cell having a first coefficient of thermal expansion;
a metallic support in electrical connection with one of the electrodes, the metallic support including a metal substrate and a compliant porous nickel layer that is bonded to the metal substrate between the cell and the metal substrate, the metal substrate having a second coefficient of thermal expansion that nominally matches the first coefficient of thermal expansion of the cell, wherein the metal substrate has a first stiffness and the compliant porous nickel layer has a second stiffness that is less than the first stiffness such that the compliant porous nickel layer can thermally expand and contract with the metal substrate; and
a bonding layer between the cell and the compliant porous nickel layer, the bonding layer being interfacially bonded with the compliant porous nickel layer and the cell.

2. The fuel cell as recited in claim 1, wherein the compliant porous nickel layer is a wire mesh.

3. The fuel cell as recited in claim 1, wherein the metal substrate comprises stainless steel.

4. The fuel cell as recited in claim 1, wherein the compliant porous nickel layer is electrically connected with a cathode of the electrodes.

5. A fuel cell comprising:
- a cell including a solid oxide electrolyte between electrodes, the cell having a first coefficient of thermal expansion; and
- a metallic support in electrical connection with one of the electrodes, the metallic support including a metal substrate and a compliant porous nickel layer that is bonded to the metal substrate between the cell and the metal substrate, the metal substrate having a second coefficient of thermal expansion that nominally matches the first coefficient of thermal expansion of the cell, wherein the metal substrate has a first stiffness and the compliant porous nickel layer has a second stiffness that is less than the first stiffness such that the compliant porous nickel layer can thermally expand and contract with the metal substrate, wherein the metal substrate has a nominal composition comprising about 22 wt % chromium, about 14 wt % tungsten, about 2 wt % molybdenum, about 0.5 wt % manganese, about 0.4 wt % silicon, about 0.3 wt % aluminum, and a balance of nickel.

6. The fuel cell as recited in claim 1, wherein the metal substrate is a solid plate having reactant gas channels.

7. The fuel cell as recited in claim 1, wherein the metal substrate is a corrugated sheet.

8. The fuel cell as recited in claim 1, wherein the metal substrate is a planar separator plate.

9. A method for processing a fuel cell, comprising:
- providing a cell having a solid oxide electrolyte between electrodes, the cell having a first coefficient of thermal expansion;
- bonding a compliant porous nickel layer to a metal substrate to form a metallic support such that the compliant porous nickel layer is between the cell and the metal substrate, with a bonding layer between the cell and the compliant porous nickel layer, the bonding layer being interfacially bonded with the compliant porous nickel layer and the cell, the metal substrate having a second coefficient of thermal expansion that nominally matches the first coefficient of thermal expansion of the cell; and
- establishing the metal substrate to have a first stiffness and the compliant porous nickel layer to have a second stiffness that is less than the first stiffness such that the compliant porous nickel layer can thermally expand and contract with the metal substrate.

10. The method as recited in claim 9, including bonding the compliant porous nickel layer to the metal substrate using at least one of diffusion bonding or welding.

11. The method as recited in claim 9, including selecting the metal substrate from a group consisting of a solid plate having reactant gas channels, a corrugated sheet, and a solid, planar separator plate.

12. The method as recited in claim 9, including selecting the compliant porous nickel layer to be a wire mesh to thereby provide the second stiffness that is less than the first stiffness.

13. A method for processing a fuel cell, comprising:
- providing a cell having a solid oxide electrolyte between electrodes, the cell having a first coefficient of thermal expansion;
- bonding a compliant porous nickel layer to a metal substrate to form a metallic support such that the compliant porous nickel layer is between the cell and the metal substrate, the metal substrate having a second coefficient of thermal expansion that nominally matches the first coefficient of thermal expansion of the cell;
- establishing the metal substrate to have a first stiffness and the compliant porous nickel layer to have a second stiffness that is less than the first stiffness such that the compliant porous nickel layer can thermally expand and contract with the metal substrate; and
- selecting the metal substrate to include a composition comprising about 22 wt % chromium, about 14 wt % tungsten, about 2 wt % molybdenum, about 0.5 wt % manganese, about 0.4 wt % silicon, about 0.3 wt % aluminum, and a balance of nickel.

14. The fuel cell as recited in claim 1, wherein the porous nickel layer is diffusion bonded to the metal substrate.

15. The fuel cell as recited in claim 1, wherein the bonding layer is a distinct layer from the cell.

16. The fuel cell as recited in claim 15, wherein the bonding layer is a solid oxide.

17. The fuel cell as recited in claim 1, wherein the bonding layer is planar.

\* \* \* \* \*